US007002489B1

(12) United States Patent
Denker et al.

(10) Patent No.: US 7,002,489 B1
(45) Date of Patent: Feb. 21, 2006

(54) METHOD AND SYSTEM TO CALCULATE AN APPROXIMATE LOCATION OF A MOBILE STATION IN A RECURRENT ROUTE

(75) Inventors: John Stewart Denker, Leonardo, NJ (US); Howard Paul Katseff, Marlboro, NJ (US)

(73) Assignee: AT&T Corp., New York, NY (US)

( * ) Notice: Subject to any disclaimer, the term of this patent is extended or adjusted under 35 U.S.C. 154(b) by 746 days.

(21) Appl. No.: 09/902,838

(22) Filed: Jul. 11, 2001

(51) Int. Cl.
*G08B 1/123* (2006.01)

(52) U.S. Cl. ............... 340/988; 340/539.13; 340/905; 340/994; 701/214; 701/217; 701/218; 455/404.2; 455/456.1; 455/457

(58) Field of Classification Search ............... 340/989, 340/988, 905, 990–994; 701/209, 213, 217; 455/404.2, 456.1, 457
See application file for complete search history.

(56) References Cited

U.S. PATENT DOCUMENTS

| | | | | |
|---|---|---|---|---|
| 5,634,206 A | * | 5/1997 | Reed et al. ............... | 455/277.2 |
| 5,659,596 A | * | 8/1997 | Dunn ....................... | 455/456.1 |
| 5,845,227 A | * | 12/1998 | Peterson .................... | 701/209 |
| 5,873,030 A | * | 2/1999 | Mechling et al. ........... | 455/408 |
| 5,917,811 A | * | 6/1999 | Weaver et al. .............. | 370/332 |
| 6,167,274 A | * | 12/2000 | Smith ....................... | 455/456.3 |
| 6,385,454 B1 | * | 5/2002 | Bahl et al. .................. | 455/450 |
| 6,385,458 B1 | * | 5/2002 | Papadimitriou et al. . | 455/456.2 |
| 6,424,837 B1 | * | 7/2002 | Hall et al. ................ | 455/456.5 |
| 6,507,569 B1 | * | 1/2003 | Crichton ..................... | 370/329 |
| 6,516,195 B1 | * | 2/2003 | Zadeh et al. ................ | 455/446 |
| 6,711,408 B1 | * | 3/2004 | Raith ......................... | 455/440 |
| 6,757,545 B1 | * | 6/2004 | Nowak et al. ........... | 455/456.2 |

OTHER PUBLICATIONS

Maps On Us: A map, Route and Yellow Pages Service (1 page) (Last visited on May 22, 2001) Available at http://www.mapsonus.com/.
Maps On Us User's Manual (12 pages) (Last visited on May 22, 2001), Available at http://www.mapsonus.switchboard.com/doc/maps.uman.cgi.
Maps On Us: FAQ (5 pages) (Last visited on May 22, 2001), Available at http://www.mapsonus.switchboard.com/doc/maps.faq.cgi.

* cited by examiner

*Primary Examiner*—Benjamin C. Lee

(57) ABSTRACT

A method and system for calculating the approximate location of a mobile station along a recurrent route is disclosed. In an embodiment for the method in accordance with the principles of the present invention, the method for storing reference data includes decoding a first unique identifier for a cell in communication with the mobile station at a first location and a first time, storing the first unique identifier and the first time, decoding, upon handoff to a next cell, at a second location and at a second time, a second unique identifier for the next cell, and storing the second cell identifier and the second time. In a method for calculating an estimated time of arrival at the endpoint of a segment for a mobile station traveling along a recurrent route of travel, the method includes detecting the startpoint of one of the plurality of segments at a first time, and calculating an estimated time of arrival at the endpoint of the segment. In an embodiment of a system in accordance with an embodiment of the invention, the system includes a mobile station, a first cellular base station, a second cellular base station, a database, and a processor.

29 Claims, 6 Drawing Sheets

METHOD AND SYSTEM TO CALCULATE AN APPROXIMATE LOCATION OF A MOBILE STATION IN A RECURRENT ROUTE

This invention is related to U.S. patent application Ser. No. 09/455,243, filed Dec. 6, 1999, now U.S. Pat. No. 6,253,146, issued Jun. 26, 2001, entitled "A Network-Based Traffic Congestion Notification Service," the entire contents of which are incorporated herein by reference.

TECHNICAL FIELD

The invention relates to the field of mobile station location determination.

BACKGROUND OF THE INVENTION

Location-based services, such as traffic reporting and concierge services, can provide personalized information when the location-based services know the approximate location of a mobile station (e.g., a mobile station in a vehicle). Previous solutions have depended on getting information from a base station as to the location of the mobile station. This is problematic because of the uneven deployment of such capabilities in base stations.

Some mobile stations allow application code to run in the mobile station, and it is expected that such capabilities will become more common and more powerful. A location-based application in a mobile station would likely be able to access call connection information including a Base Station Identifier of a base station in communication with the mobile station. Using a method described herein, the location-based application could determine approximate mobile station location. The invention avoids the use of expensive hardware, such as a GPS receiver, to determine mobile station location.

SUMMARY OF THE INVENTION

A method and system for calculating an approximate location of a mobile station along a recurrent route is provided. In an embodiment for storing reference data used in a mobile station location identification system a method may include, decoding a first unique identifier for a cell in communication with the mobile station at a first location and a first time, storing the first unique identifier and the first time in a database, decoding, upon handoff to a next cell, at a second location and at a second time, a second unique identifier for the next cell, and storing the second cell identifier and the second time in the database.

In a method for calculating an estimated time of arrival at the endpoint of a segment for a mobile station traveling along a recurrent route of travel, the recurrent route of travel divisible among a plurality of segments, each of the plurality of segments having a startpoint and an endpoint, the method may include detecting the startpoint of one of the plurality of segments at a first time, and calculating an estimated time of arrival at the endpoint of the segment. Calculation may be accomplished by retrieving a stored travel time for travel along the segment from a database, and adding the stored travel time and the first time to yield the estimated time of arrival at the endpoint of the segment.

In an embodiment of a system, the system may include a mobile station, having hardware to decode a unique identifier, a first cellular base station covering an area included with a first location, and a second cellular base station covering an area included with a second location, a database, to store a time of travel of the mobile station from the first location to the second location, and a processor, to calculate the approximate location of a mobile station along the recurrent route of travel between the first location and the second location.

BRIEF DESCRIPTION OF THE DRAWINGS

The various features of the invention will best be appreciated by simultaneous reference to the description which follows and the accompanying drawings, in which.

DETAILED DESCRIPTION

The approximate location of a mobile station that is travelling along a recurrent route may be calculated based on the time since the mobile station was handed-off from one cellular base station to an adjacent cellular base station. In an embodiment, a system for calculating the approximate location of the mobile station may require prior data regarding the sequence of timing between handoffs of the mobile station as it travels along the recurrent route. Once provided with this data, the system may calculate the approximate location of the mobile station by expressing the approximate location in terms of relative distance or time from a known location, such as a cellular base station boundary.

Training

Before using the system to calculate an approximate location of a mobile station, it may be necessary to "train" the system as to a sequence of timing of handoffs between the start of a route and the end of the route. Training may be accomplished by a method of decoding a first unique identifier for a cell in communication with a mobile station at a first location and a first time; storing the first unique identifier and the first time in a database; decoding, upon handoff to a next cell, at a second location and at a second time, a second unique identifier for the next cell; and storing the second unique identifier and the second time in the database. The time for travel between the first location and the second location may be calculated by subtracting the second time from the first time to yield the travel time. These steps may be repeated to store the sequence of timing of handoffs as the mobile station proceeds along the recurrent route. The travel time for each segment of the recurrent route may be stored in a database and indexed to either the first or second unique identifier. The database can optionally be located in the mobile station or in a system server.

Figure 1A:
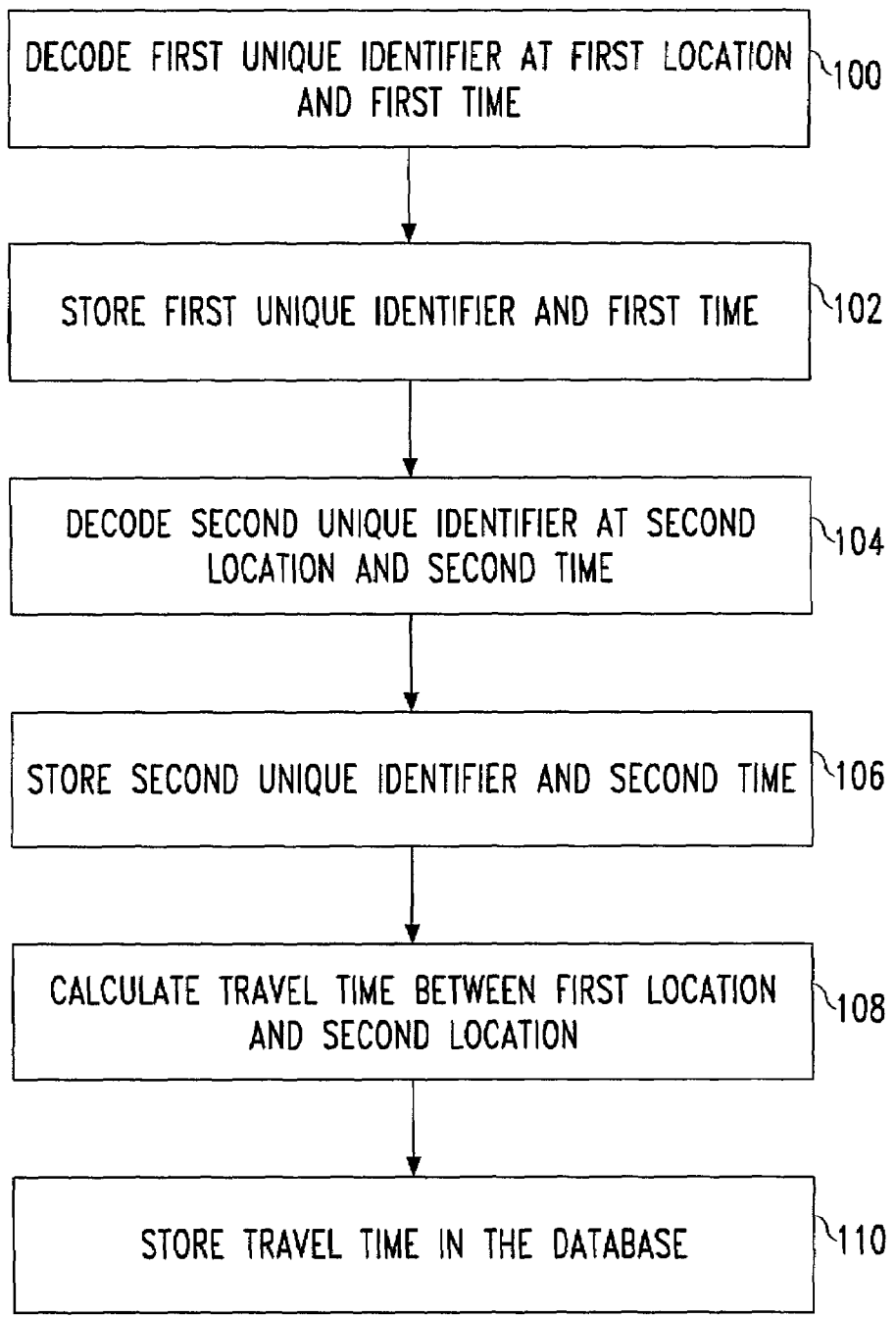
FIG. 1A is a flow diagram of a method of training in accordance with one embodiment of the invention.

FIG. 1A is a flow diagram according to one embodiment of the invention, for "training" the system as to a sequence of timing between handoffs in a recurrent route. At step 100, a mobile station decodes a first unique identifier for a cell in communication with the mobile station at a first location and a first time. At step 102, the first unique identifier and the first time are stored. At step 104, a second unique identifier is decoded when the mobile station is handed-off to an adjacent cell, at a second location and at a second time. At step 106, the second unique identifier and the second time are stored. Storage may be local or remote to the mobile station. The data may be placed in a database. At step 108, the time for travel between the first location and the second location may be calculated by subtracting the second time from the first time to yield the travel time. At step 110, travel time for travel along the segment defined by the boundary of the first and second locations can be stored in the database and indexed to either the first or second unique identifier, or the segment bounded by the first and second unique identifiers.

Figure 1B:
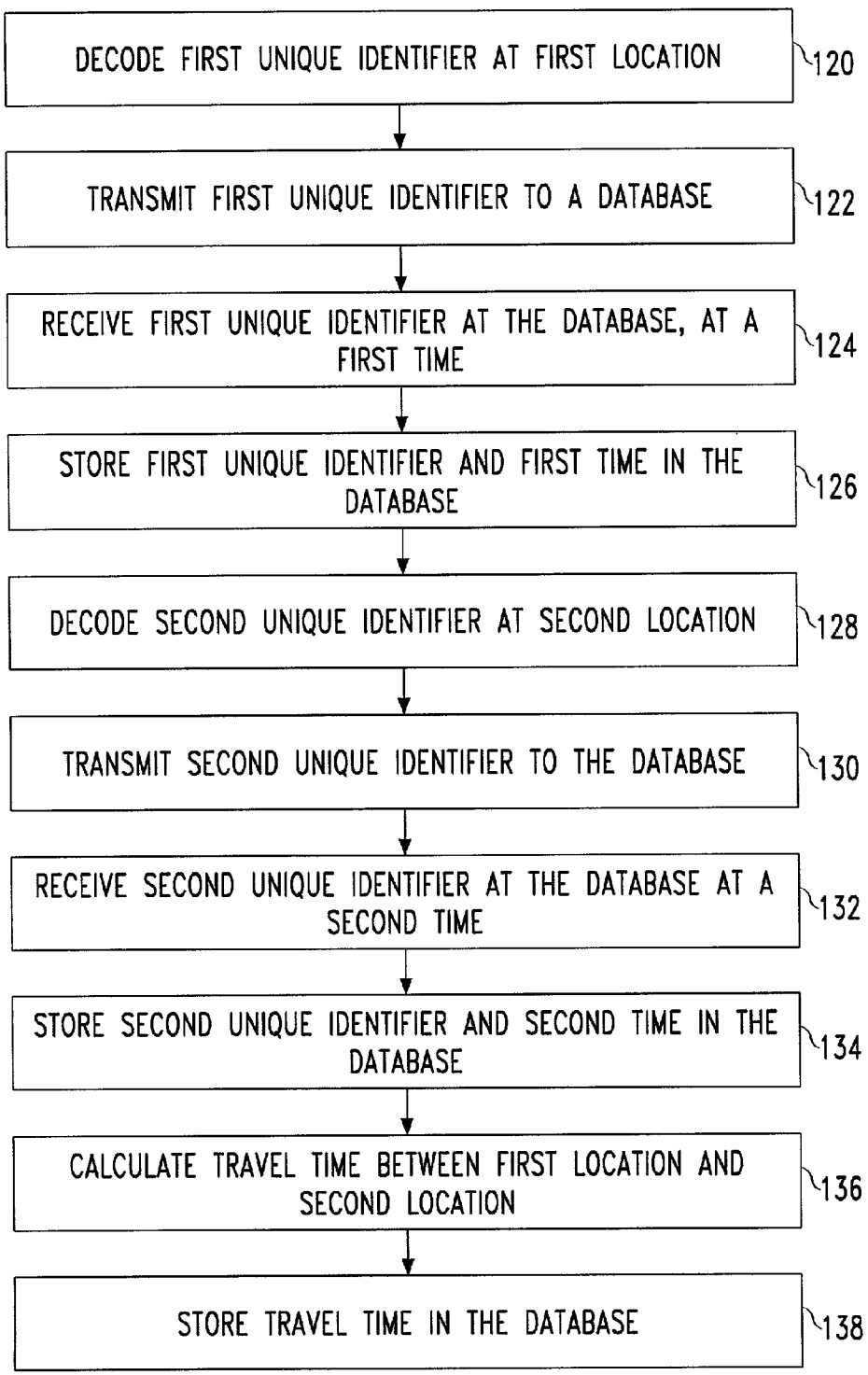
FIG. 1B is a flow diagram of a method of training in accordance with another embodiment of the invention.

FIG. 1B is a flow diagram according to another embodiment of the invention, for "training" the system as to a sequence of timing between handoffs in a recurrent route. At step 120, a mobile station decodes a first unique identifier for a cell in communication with the mobile station at a first location. At step 122, the first unique identifier may be transmitted to a database. At step 124, the first unique identifier may be received at the database at a first time. At step 126, the first time and the first unique identifier may be stored at the database. At step 128, a second unique identifier is decoded upon handoff to a next cell, at a second location. At step 130, the second unique identifier may be transmitted to the database. At step 132, the second unique identifier may be received at the database at a second time. At step 134, the second time and the second unique identifier may be stored at the database. At step 136, the time for travel between the first location and the second location may be calculated by subtracting the second time from the first time to yield the travel time. At step 138, travel time for travel along the segment defined by the boundary of the first and second locations can be stored in the database and indexed to either the first or second unique identifier, or the segment bounded by the first and second unique identifiers.

Figure 2:
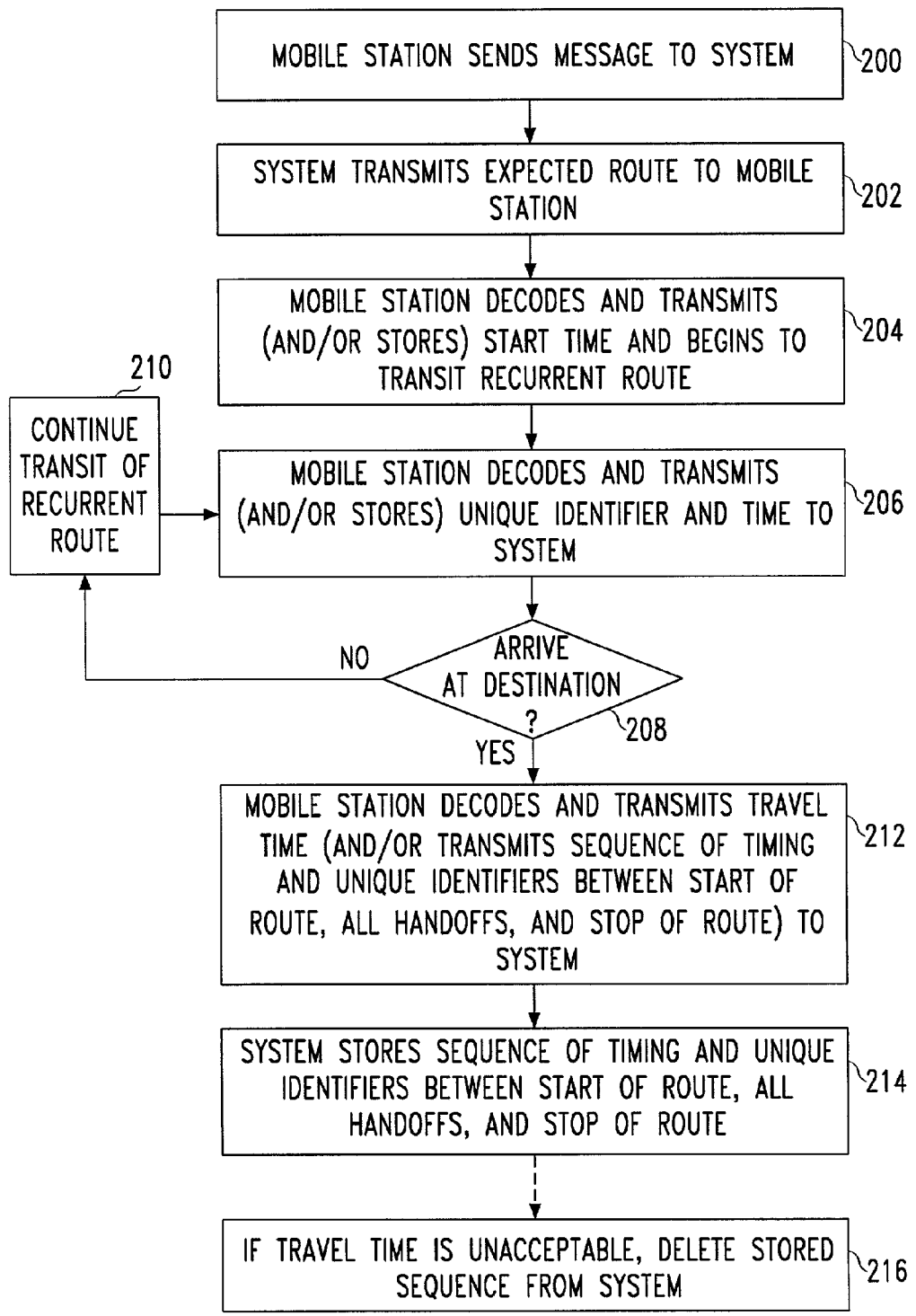
FIG. 2 is a flow diagram of a method of training in accordance with an embodiment of the invention.

The method of training a system may be better understood by reference to FIG. 2, which is a flow diagram of one possible method of training in accordance with an embodiment of the invention. In FIG. 2, at step 200, a mobile station may send a message to the system indicating that it will be traveling from a location A to a location B. At step 202, the system may transmit to the mobile station the route that it expects the mobile station to proceed along. At step 204, the mobile station may decode and transmit a starting time to the system and begin to travel along the expected route. Alternatively, the mobile station may store the starting time. The mobile station continues along the expected route. At a handoff from a first base station to a second base station, at step 206, the mobile station may decode a unique identifier of the base station it is to be handed-off to and may transmit that unique identifier, along with a time, to the system. Alternatively, the mobile station may store the unique identifier of the base station as well as the corresponding time. If, at step 208, the mobile station has not arrived at its destination then, at step 210, the mobile station continues to travel along the expected route. The obtaining and transmitting (or alternatively storing) of step 206 is repeated at each handoff from one base station to a next adjacent base station as the mobile station proceeds along its route. If, at step 208, the mobile station has arrived at its destination then, at step 212, the mobile station may transmit a message informing the system that travel along the expected route is complete. If the mobile station had stored a sequence of timing between the startpoint of travel along the expected route, all cellular handoffs between cellular base stations along the route, and the arrival at the endpoint of the route, then this information may be transmitted at step 212.

A time may also be decoded and transmitted at step 212. Of course, the mobile station may not have a capability to determine that it has arrived at its destination. User interaction, such as pressing a button, may be required to alert the mobile station that it has arrived at its destination. At step 214, the system stores the sequence of timing between the startpoint of travel along the expected route, all cellular handoffs between cellular base stations along the route, and the arrival at the endpoint of the route. At step 216, a signal may be transmitted to the system indicating that the travel time along the route was unacceptable. In that instance, the system may not retain the sequence of timing between start and handoffs of cellular base stations along the route and training may be repeated. One possible reason of unacceptable travel time during a training session may be that there was unusual traffic congestion along one or more of the segments of the route.

The methods of FIGS. 1A, 1B, and 2 are exemplary methods of providing a sequence of timing information to the system in accordance with the invention. In other embodiments, the system may not require training, per se, as to the travel times for each segment of the recurrent route. In other embodiments, it may be possible to obtain travel time for a given segment from pre-stored time and distance parameters for the given segment from a database of such parameters. While the methods of FIGS. 1A and 2 include transmitting a time along with each unique identifier encountered along the recurrent route, a system may alternatively use the time of receipt of the unique identifier to calculate the travel time along a segment, as illustrated in the example of FIG. 2B. The amount of information transmitted from the mobile station to the database would be reduced using such an embodiment. Furthermore, in another embodiment, the mobile station may store each unique identifier and associated handoff time in its own memory and transmit the entirety of that information to the system in one transmission at the conclusion of travel along a route.

System Operation

As a mobile station travels along a recurrent route, it may pass through one or more cellular base station coverage areas. As a mobile station proceeds from cellular base station coverage area to cellular base station coverage area, the cellular network hands-off the mobile station from base station to base station. At each handoff, the system may be updated with a handoff time, such as the current local time of day or a standardized time such as Coordinated Universal Time ("UTC"), and a unique identifier for the cellular base station that is now in communication with the mobile station.

Because the mobile station is proceeding along a known recurrent route from a known start location, and because cellular base station coverage area boundaries (i.e., handoff points) are approximately known, the mobile station's approximate location along the recurrent route can be calculated.

Approximate location can be calculated, for example, with respect to a time since the start of travel along the recurrent route, or since handoff to a given base station. The approximate location may also be calculated, for example, with respect to expected time of arrival at a segment boundary, or at the endpoint of the recurrent route. Also, because the system has stored data regarding the timing of handoffs between cellular base stations along the recurrent route on previous occasions, the system may determine if the mobile station is being delayed on its route, thus giving the system an ability to identify potential traffic congestion areas along the recurrent route.

A system to calculate an approximate location of a mobile station in a recurrent route can be used to approximate the location of any mobile station between two geographic points. The mobile station may be traveling on some combination of pathways such as streets, roads, highways, freeways, and toll-roads. However, nothing contained herein should be construed as limiting the invention to such exemplary pathways, as the invention is equally suited for use on other types of pathways, whether paved or unpaved. The invention may also be adapted to pedestrians and to conveyances of all kinds, including aquatic vessels and aircraft. The recurrent route may be divided into segments. As used herein, the word "segment" refers to portions of the recurrent route bounded by transition areas between one cellular base station coverage area and another. Segments may also refer to portions of the recurrent route that are defined at a segment's endpoints by geocode locations, (e.g., latitude and longitude). For ease of explanation, the discussion herein is explained in terms of the cellular network of one cellular provider, however, the invention may be used in a recurrent route where the mobile station may use two or more cellular providers (i.e., in a roaming situation).

Figure 3:
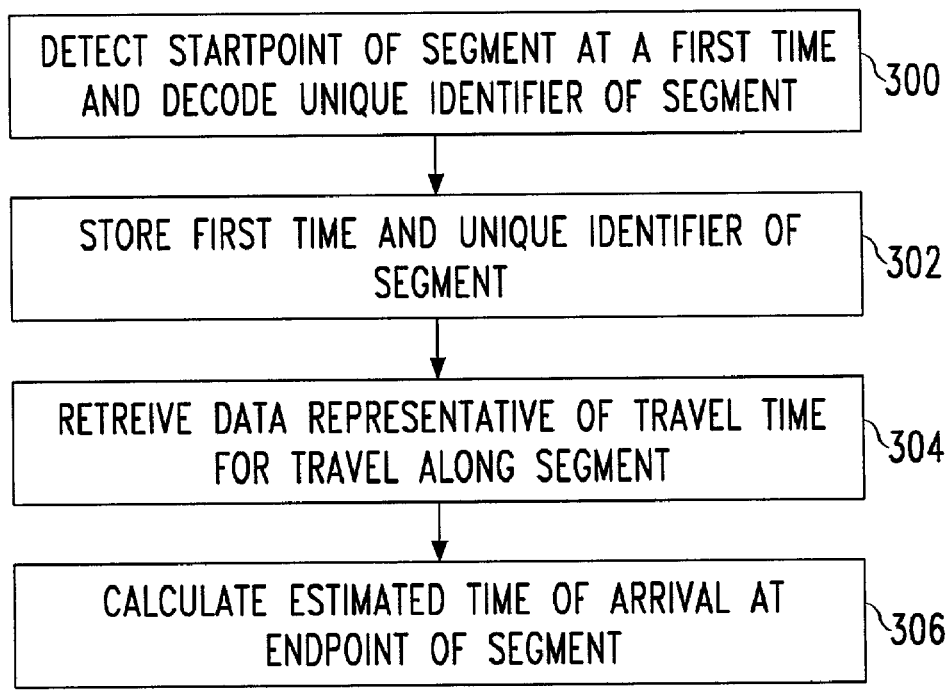
FIG. 3 is a block diagram of a method of estimating the time of arrival of a mobile station at a segment endpoint in accordance with an embodiment of the invention.

FIG. 3 is a block diagram of a method of estimating the time of arrival of a mobile station at a segment endpoint, of a segment having a startpoint and an endpoint, in a recurrent route of travel, in accordance with an embodiment of the invention. At step 300, the system detects the startpoint of the segment at a first time, and the system decodes the unique identifier of the segment. At step 302, the system stores the first time and the unique identifier of the segment. At step 304, the system retrieves data representative of a travel time for travel along the segment identified by the unique identifier. Such data may have been stored in a database during the training of the system, as described hereinabove. The data may optionally be located at a system server or at the mobile station. At step 306, the system calculates an estimated time of arrival at the endpoint of the segment by, for example, adding the retrieved travel time and the first time to yield the estimated time of arrival at the endpoint of the segment. System calculations may be performed optionally at the mobile station or at the system server.

In another embodiment, the system may calculate an approximate location of a mobile station traveling along a recurrent route of travel, the recurrent route of travel divisible among a plurality of segments, each of the plurality of segments having a startpoint and an endpoint. The method may include detecting the startpoint of one of the plurality of segments at a first time and decoding a unique identifier associated with the segment. The approximate location of the mobile station, in terms of distance from or to a known point, may be calculated based on the geography of the recurrent route, speed of travel along the route, and a travel time from the first time. The calculation of the approximate location of the mobile station may optionally occur at the mobile station or at the system server.

Illustrative Example

Figure 4:
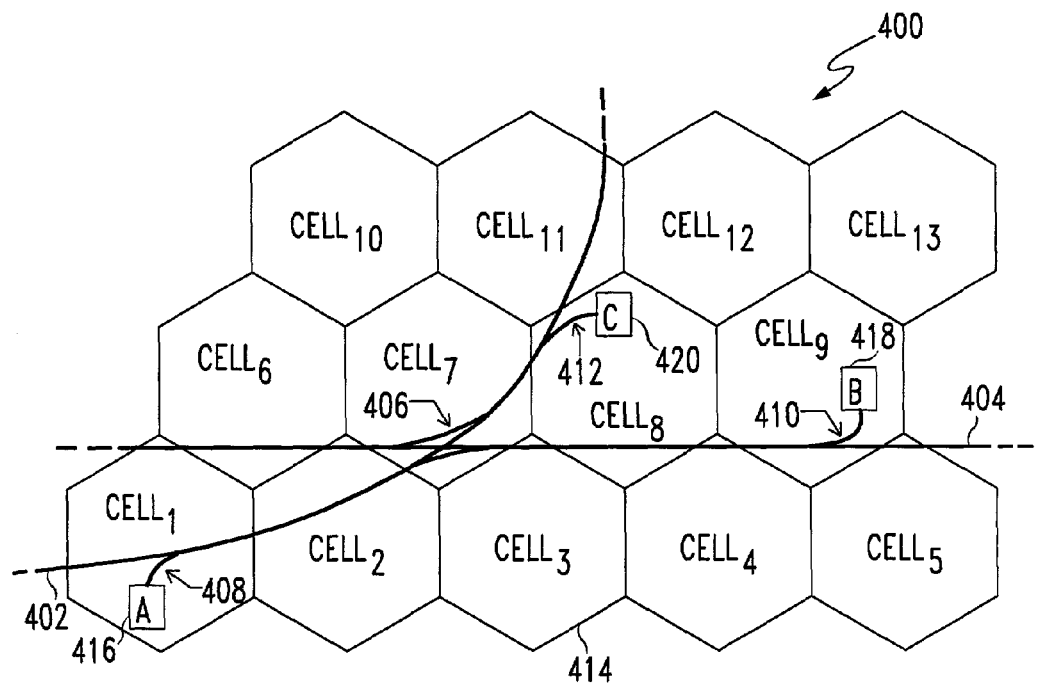
FIG. 4 depicts a map presented to aid in an explanation of an embodiment of the invention.

Cells in a cellular network provide coverage to a specific geographic area. Typically, multiple cells are provided adjacent to one another to cover a large geographic area. While it may be useful to consider cells as being distributed according to a honeycomb arrangement as shown in FIG. 4, this ideal case often is disturbed in practice. FIG. 4 depicts a map 400 presented to aid in an explanation of an embodiment of the invention. The map 400 depicts exemplary pathways 402, 404, an interchange 406, and on/off-ramps 408, 410, 412. Cellular base station coverage areas 414 are also depicted. Locations labeled "A" 416, "B" 418, and "C" 420 are shown on the map 400. The locations 416, 418, 420 may be representative of start and stop points of various recurrent routes traveled by a mobile station. For instance, location A 416 may represent an area in the proximity of a mobile station user's home, location B 418 may represent an area in the proximity of the mobile station user's workplace, and location C 420 may represent an area in the proximity of an evening college that the mobile station user attends after work.

In accordance with an embodiment of the invention, the mobile station informs a system of the mobile station user's intention to begin travel from, for example, home to work (i.e., location A 416 to location B 418). The user may identify an intention to travel from one location to another by entering a start and stop geographic location, or by entering a single reference identifier (such as "route number 5," or "work"), or by any other method known to those of skill in the art. Alternate routes from a given start point to a given end point may be stored. In an embodiment having alternate routes, the system may analyze which route will provide the shortest travel time based on, for example, statistical data of travel on that route for that time of day and day of year, or perhaps on information obtained from other sources such as traffic reporting bureaus. The system may identify, to the mobile station, a recurrent route upon which the system expects the mobile station to travel. This identification may be for the benefit of the user, to remind the user of a path taken in the past or to provide the user with the best possible path between the indicated start and end points. For example, the system may indicate that the mobile station is expected to travel along a route which begins at on/off ramp 408, proceeds along pathway 402 to interchange 406, transfers to pathway 404, and ends at on/off ramp 410. Along the recurrent route, the mobile station will travel through various cellular base station coverage areas 414.

As depicted in FIG. 4, cellular base station coverage areas 414 labeled $Cell_1$ through $Cell_{13}$, overlay the pathways 402, 404, interchange 406 and on/off ramps 408, 410, 412. Cellular base station coverage areas 414 are depicted in FIG. 4 as being hexagonal in shape and of equal size, however, as is known to those skilled in the art, coverage areas are usually irregular in shape and may be of varying sizes. Cellular base station coverage areas 414 may typically be approximately two miles in diameter. The coverage in rural areas may tend to be larger. However, cellular base station coverage areas may be divided into smaller micro or nano areas as required by geographic topology or other factors. Heavily traveled routes tend to have relatively small cells, which may work to the advantage of this invention.

Figure 5:
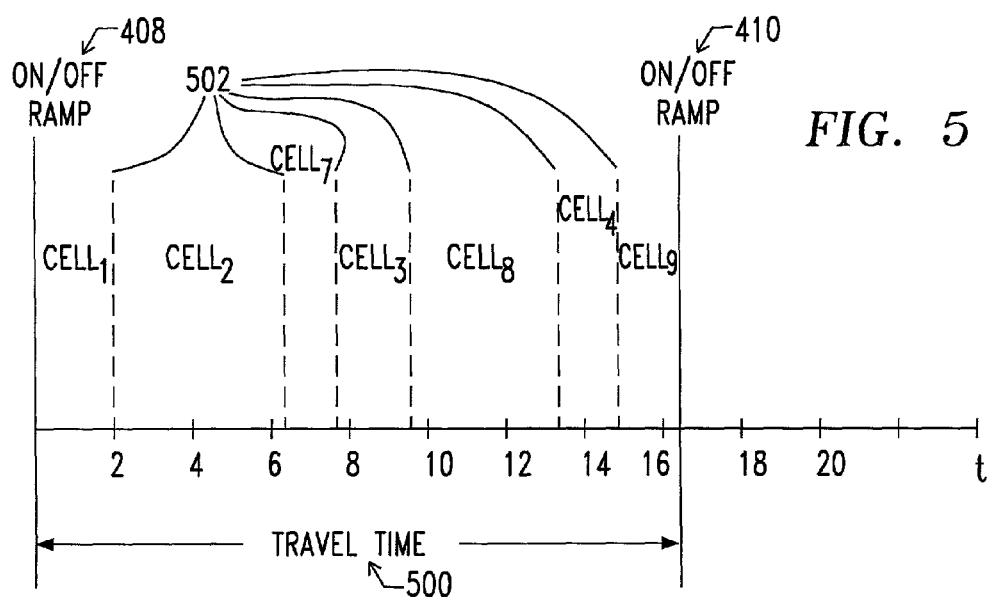
FIG. 5 is a graph that represents, for the example of FIG. 4, the travel time of a mobile station in a recurrent route in accordance with an embodiment of the invention.

FIG. 5 is a graph that represents, for the example of FIG. 4, the travel time 500 for a recurrent route from on/off ramp 408 to on/off ramp 410, with indications of handoffs 502 of the mobile station as the mobile station passes from segment to segment. As illustrated in FIG. 5, the travel time between handoffs is not necessarily equal for apparently equal segment lengths. For example, in FIG. 4 the illustrated distance of travel along pathway 404 through the $Cell_8$ (FIG. 4) segment is approximately equal to the illustrated distance of travel along pathway 404 through the $Cell_4$ (FIG. 4) segment, however, as depicted in FIG. 5, the travel time within the $Cell_8$ segment is twice that of the $Cell_4$ segment. Variations in travel time on apparently equal length segments may be due to, for example, changes in speed limit between or within the segments. In the example of FIG. 5, the difference may be due to the speed limit within the $Cell_8$ segment being one half that of the speed limit within the $Cell_4$ segment. Of course, the amount of time it takes to transit a given segment may also be affected by, for example, traffic accidents or construction along the segment.

Given the time since entry into a segment, the system may calculate the approximate location of a mobile station along the recurrent route by mathematical manipulation of a stored travel time for the segment and the time since entry into that segment. For example, in FIG. 5, the total time for the travel from on/off ramp 408 to on/off ramp 410 is plotted along the X-axis. For example only, the system would be able to calculate that the approximate location of the mobile station one minute after handoff from $Cell_3$ to $Cell_8$. Approximate location may be expressed in relative distance or time from a known location, such as a segment boundary. For example, the system may have data that indicates that in the approximately four minutes that the mobile station is recurrently in communication with the base station of $Cell_8$ the mobile station recurrently travels 3.74 miles. The system may also have data indicative of, for example, a speed of travel on the $Cell_8$ segment. The system would be able to calculate the approximate location of the mobile station by calculation (as explained above, for example).

The system may also have data on changes in speed of travel within any given segment; for example, the segment may include travel on a residential street at 20 mph and travel on a boulevard at 45 mph. Such data may be used to refine the accuracy of any location calculation. Likewise, the system would be able to calculate the approximate time to arrival at a segment boundary. Given distances traveled along the segments of the recurrent route and geographic location data regarding the segment boundaries, the approximate location in terms of latitude and longitude may be calculated based on the time a mobile station is in a given segment.

System Components

A system to calculate an approximate location of a mobile station along a recurrent route of travel between a first location and a second location, may include a first cellular base station, to provide coverage to the mobile station in a geographic area including the first location, the mobile station may include hardware to decode a unique identifier of each base station in communication with the mobile station; a second cellular base station, to provide coverage to an area including the second location; a database, to store at least a time of travel of the mobile station from the first location to the second location; and a processor, to calculate the approximate location of a mobile station along the recurrent route of travel between the first location and the second location. The database and or processor may individually or collectively be included within the mobile station, or they may be remote to the mobile station. The approximate location may be calculated in terms of time to reach the second location or in terms of time from the first location. The unique identifier of the cellular base station may be, for example, a Cell Tower Identification Number or a Base Station Identifier.

The system database may additionally store a geographic description of the recurrent route, a time at which the mobile station enters or exits each segment of the recurrent route, travel times between cellular handoffs (i.e., the time in a segment), and/or travel times from a given handoff to an on/off ramp or interchange. In addition, the system database may also store higher-order statistics, such as the variance in handoff times and the dependence of travel time on, for example, time of day and/or day of year. Based on this stored information, the system may calculate the approximate location of the mobile station.

Figure 6:
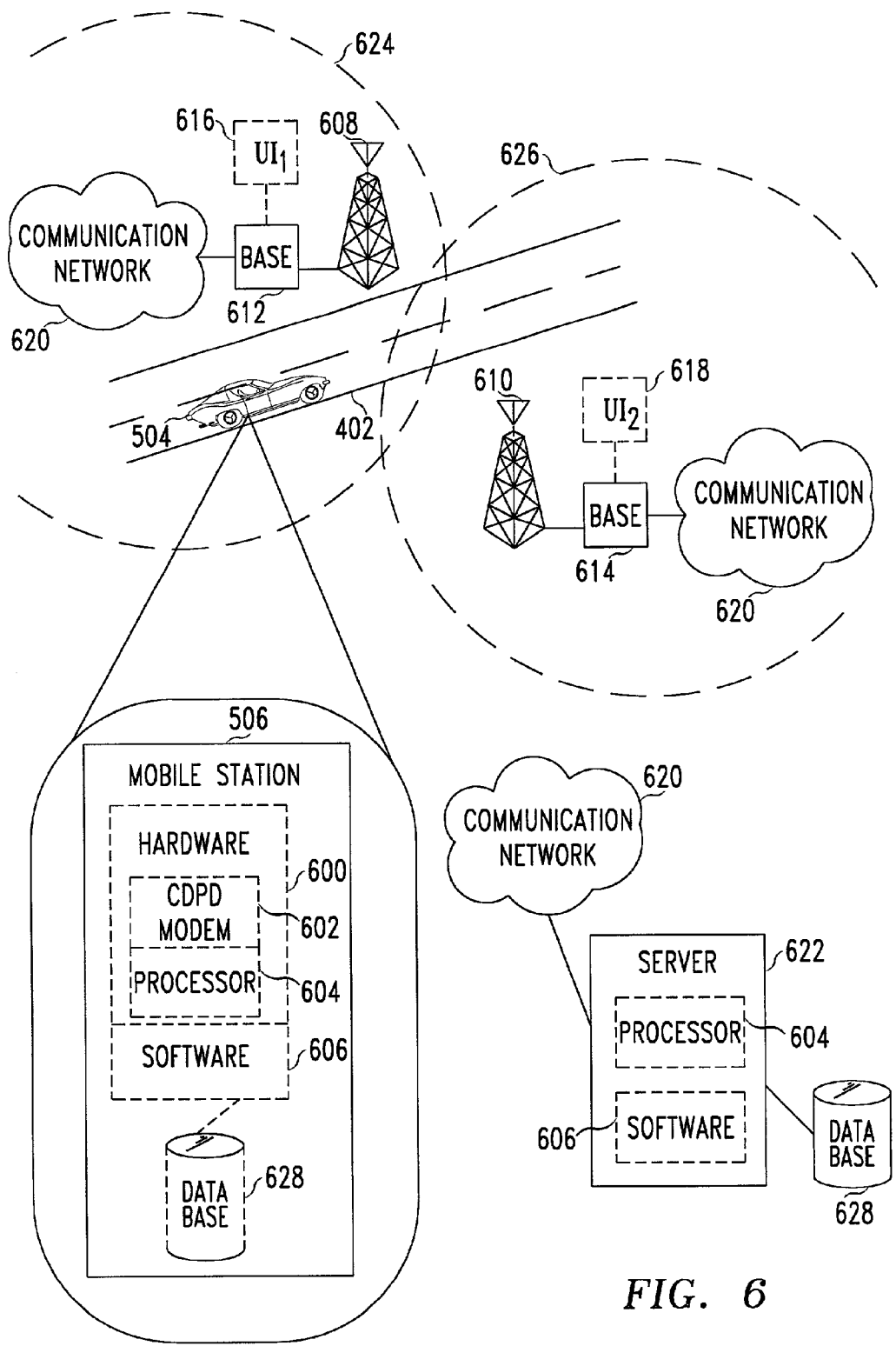
FIG. 6 is an illustration of a mobile station transiting two cellular coverage areas, in accordance with an embodiment of the invention.

A better understanding of the operation of an embodiment of the system is facilitated by the example of FIG. 6. FIG. 6 is an illustration of a mobile station 506 transiting two cellular coverage areas, in accordance with an embodiment of the invention. As illustrated in FIG. 6, a vehicle 504, including a mobile station 506, proceeds along a pathway 402. The mobile station 506, may be a wireless cellular telephone or any wireless cellular device capable of communicating on a wireless network. The mobile station 506 includes hardware 600, such as a CDPD modem 602, that may be used to acquire an identification number (and thus a location) of a cellular base station closest to the mobile station 506, and a processor 604 to execute software for calculations required by the system. The mobile station 506 may also include software 606 used in conjunction with the hardware 600, and also used to communicate with other parts of the system identified herein and to perform calculations related to approximate mobile station location. As the vehicle 504 proceeds along the pathway 402, it passes within range of cellular towers 608, 610, each having a base station 612, 614, respectively.

It will be understood that each base station typically requires at least one antenna to communicate with mobile stations. A tower may support the antenna, however this is not always the case. The antenna of a base station may be supported by a structure other than a tower. While the illustration of FIG. 6 makes reference to cellular towers, each tower having its own base station, it will be understood by those of skill in the art that every cell in a cellular network does not require a tower.

Each base station, whether associated with a tower or not, has its own unique identifier. One example of a unique identifier may be a Cell Tower Identification Number ("CTIN") that identifies a specific tower face on a given tower. Another example of a unique identifier may be a Base Station Identifier 9 ("BSI"), which identifies, among other things, the base station's geographic location. In FIG. 6, for ease of illustration, the unique identifier of base station 612 is represented herein as $UI_1$ 616, while the unique identifier of base station 614 is represented herein as $UI_2$ 618.

In operation, a mobile station 506 is in communication with a base station 612 via radio communication between the mobile station 506 and the cellular tower 608 coupled to that base station 612. The base station 612 is, in turn, in communication with a communications network 620, which may be, for example, the Internet or a public switched telephone network ("PSTN"). In one embodiment of the invention, the communications network 620 may, in turn, be in communication with a computing device or server 622 that includes a system to calculate the approximate location of mobile stations in a recurrent route. A database 624 in communication with the server 622 may store data as necessary to perform calculations required for the method of the invention. The database 624 may alternatively be include in the mobile station 506. A processor 604 included in the server 622 may execute software 606 for calculations required by the system, including calculations related to approximate mobile station location.

As illustrated in FIG. 6, as the mobile station 506 travels toward the boundary of a first cellular transceiver area 624 the signal received by that cellular transceiver area's 624 cellular base station 612 diminishes in strength. Concurrently, as the mobile station 506 in the vehicle 504 travels toward the boundary of an adjacent cellular transceiver area 626 the signal received by that adjacent cellular transceiver area's 626 cellular base station 614 increases in strength. Based in part on received signal strength at each of the base stations 612, 614, the cellular system performs an operation wherein communications to and from the mobile station 506 are handed-off from cellular base station 612 to cellular base station 614. For a mobile station traveling along a route intersecting the boundary between two cellular transceiver areas 624, 626, the handoff point may occur at substantially the same place for each journey taken in a given direction. The handoff point may vary to some degree due to weather conditions or other occurrences that alter the power of the signal received by a cellular base station 612, 614, however, for the purposes of the invention described herein, such a variation in handoff point will not affect the method or system of the invention.

In another embodiment of the invention, the database and the processor that performs the required calculations could be collocated with the mobile station 506. In general, the invention allows a wide range of tradeoffs as to what features are implemented by the mobile station 506 and what features are implemented by servers 622 in the communication network 620. These tradeoffs may be made on a user-by-user basis, depending on the capabilities of the mobile station 506.

The illustration of FIG. 6 depicts only one communications network 620, however, it will be understood that intermediate communications networks (not shown) may be used to establish and maintain communication between a base station, such as base station 612, and a server, such as server 622. It will also be understood that the cellular telephone system described herein is greatly simplified and omits numerous intermediary functional blocks, such as mobile switching centers, for the sake of simplifying the explanation of the invention disclosed herein.

In another embodiment of the invention, the time at which a handoff occurs is not included in the message from the mobile station to the system. Instead, the system uses the time of message receipt to calculate the time it takes the mobile station to travel a given segment.

In another embodiment of the invention, a subset of mobile stations, such as a set of mobile stations augmented with Global Positioning Satellite geolocation receivers could be used to populate a database with information regarding actual speeds along any given segment. The speeds could be mapped to time of entry and exit of a segment as well as to specific geolocation within a segment. The special set of mobile stations could travel along segments at various times of day and on various days throughout the year to acquire information regarding changes in traffic patterns (e.g., due to rush hour commuting) as a function of time of day and day of year.

The disclosed embodiments are illustrative of the various ways in which the present invention may be practiced. Other embodiments can be implemented by those skilled in the art without departing from the spirit and scope of the present invention.

What is claimed is:

1. A method of training a mobile station location identification system, comprising:
   decoding a first unique identifier that uniquely identifies a first cell that is in communication with a mobile station when the mobile station is located at a first location on a first boundary of the first cell at a first time;
   storing the first unique identifier and the first time;
   decoding, upon handoff to a second cell at a second location on a second boundary of the second cell and at a second time at which the mobile station is located on the second boundary, a second unique identifier that uniquely identifies the second cell; and
   storing the second unique identifier and the second time;
   wherein the stored first and second unique identifiers and the stored first and second times are configured to be used by the mobile station location identification system to identify the location of the mobile station.

2. The method of claim 1, further comprising:
   calculating a travel time for travel between the first location and the second location, comprising subtracting the second time from the first time to yield the travel time.

3. The method of claim 2, further comprising:
   storing the travel time for travel between the first location and the second location.

4. The method of claim 3, wherein the stored travel time is indexed to a segment bounded by the first location and the second location.

5. The method of claim 3, wherein the travel time is stored in the mobile station.

6. The method of claim 3, wherein the travel time is stored in a server.

7. The method of claim 1, wherein the unique identifier is a Cell Tower Identification Number.

8. The method of claim 1, wherein the unique identifier is a Base Station Identifier.

9. The method of claim 1, further comprising, deleting the stored travel time upon receipt of a signal from the mobile station.

10. A method of training a mobile station location identification system, comprising:
    decoding a first unique identifier that uniquely identifies a first cell that is in communication with the mobile station when the mobile station is located at a first location on a first boundary of the first cell;
    transmitting the first unique identifier to a database;
    receiving, at the database, at a first time, the first unique identifier;
    storing, at the database, the first time and the first unique identifier;
    decoding, upon handoff to a second cell at a second location on a second boundary of the second cell, a second unique identifier that uniquely identifies the second cell;
    transmitting the second unique identifier to the database;
    receiving, at the database, at a second time, the second unique identifier; and
    storing, at the database, the second time and the second unique identifier;
    wherein the stored first and second unique identifiers and the stored first and second times are configured to be used by the mobile station location identification system to identify the location of the mobile station.

11. The method of claim 10, further comprising:
calculating a travel time for travel between the first location and the second location, comprising subtracting the second time from the first time to yield the travel time.

12. The method of claim 11, further comprising:
storing the travel time for travel between the first location and the second location in the database.

13. The method of claim 12, wherein the stored travel time is indexed to a segment bounded by the first location and the second location.

14. The method of claim 10, wherein the unique identifier is a Cell Tower Identification Number.

15. The method of claim 10, wherein the unique identifier is a Base Station Identifier.

16. The method of claim 10, wherein the database is located in the mobile station.

17. The method of claim 10, wherein the database is located in a server.

18. The method of claim 10, further comprising, deleting the stored travel time from the database upon receipt of a signal from the mobile station.

19. A method of calculating an estimated time of arrival of a mobile station at a segment endpoint, of a segment having a startpoint and an endpoint, comprising:
  a) detecting the startpoint of the segment at a first time;
  b) storing the first time; and
  c) calculating an estimated time of arrival at the endpoint of the segment, the calculating step comprising:
  c1) retrieving a stored travel time for travel along the segment from a database, wherein the stored travel time is derived using a method comprising:
    i) decoding a first unique identifier that uniquely identifies a first cell that is in communication with a mobile station when the mobile station is located at the startpoint on a first boundary of the first cell at a start time;
    ii) storing the first unique identifier and the start time;
    iii) decoding, upon handoff to a second cell at the endpoint on a second boundary of the second cell and at an end time at which the mobile station is located at the second boundary, a second unique identifier that uniquely identifies the second cell;
    iv) storing the second unique identifier and the end time, wherein the stored first and second unique identifiers and the stored start and end times are configured to be used by a mobile station location identification system to identify a location of the mobile station; and
    v) subtracting the end time and the start time and storing a result as the stored travel time; and c2) adding the stored travel time and the first time to yield the estimated time of arrival of the mobile station at the endpoint of the segment.

20. The method of claim 19, wherein the database is located in the mobile station.

21. The method of claim 19, wherein the database is located in a server.

22. The method of claim 19, wherein the estimated time of arrival of the mobile station at the endpoint of the segment is calculated at the mobile station.

23. The method of claim 19, wherein the estimated time of arrival of the mobile station at the endpoint of the segment is calculated at the server.

24. The method of claim 19, wherein the stored travel time includes statistical data to use in the calculation of the estimated time of arrival.

25. The method of claim 24, wherein the statistical data includes variance due to time of day in stored travel times for travel along the segment.

26. The method of claim 24, wherein the statistical data includes variance due to day of year in stored travel times for travel along the segment.

27. A system for calculating an approximate location of a mobile station along a recurrent route of travel between a first location and a second location, comprising:
  a first cellular base station configured to provide cellular coverage to the mobile station in a first cell having a first boundary including the first location;
  a second cellular base station configured to provide cellular coverage to the mobile station in a second cell having a boundary including the second location;
  a database configured to store a previously measured time of travel of the mobile station from the first location to the second location, the previously measured time of travel having been calculated by a method including subtracting (1) a first time at which the mobile station was at the first location on the first cell's boundary, from (2) a second time at which the mobile station was at the second location on the second cell's boundary; and
  a processor configured to calculate the approximate location of the mobile station along the recurrent route of travel between the first location and the second location using the previously measured time of travel stored in the database.

28. The system of claim 27, wherein the approximate location is calculated in terms of time to reach the second location.

29. The system of claim 27, wherein the approximate location is calculated in terms of time from the first location.

* * * * *